United States Patent [19]
Matyjaszewski et al.

[11] Patent Number: 6,121,371
[45] Date of Patent: Sep. 19, 2000

[54] APPLICATION OF ATOM TRANSFER RADICAL POLYMERIZATION TO WATER-BORNE POLYMERIZATION SYSTEMS

[75] Inventors: Krzysztof Matyjaszewski; Scott G. Gaynor; Jian Qiu; Mircea Teodorescu, all of Pittsburgh, Pa.

[73] Assignee: Carnegie Mellon University, Pittsburgh, Pa.

[21] Appl. No.: 09/126,768

[22] Filed: Jul. 31, 1998

[51] Int. Cl.$^7$ .................................. C08F 2/16; C08F 4/06; C08F 293/00

[52] U.S. Cl. ...................... 524/804; 526/172; 526/192; 526/203; 526/209; 525/268; 525/301; 525/312; 524/801; 522/6

[58] Field of Search .................................... 526/172, 192, 526/203, 209; 525/268, 301, 312; 524/801, 804; 522/6

[56] References Cited

U.S. PATENT DOCUMENTS

| | | |
|---|---|---|
| 3,862,978 | 1/1975 | Decker et al. . |
| 4,145,486 | 3/1979 | Haag et al. . |
| 5,169,914 | 12/1992 | Kaszas et al. . |
| 5,405,913 | 4/1995 | Harwood et al. . |
| 5,451,647 | 9/1995 | Faust et al. . |
| 5,708,102 | 1/1998 | Fryd et al. . |
| 5,763,548 | 6/1998 | Matyjaszewski et al. . |
| 5,767,210 | 6/1998 | Lecomte et al. . |
| 5,773,538 | 6/1998 | Feiring . |
| 5,789,487 | 8/1998 | Matyjaszewski et al. ............... 525/301 |
| 5,807,937 | 9/1998 | Matyjaszewski et al. . |
| 5,811,500 | 9/1998 | Dubois et al. . |
| 5,854,364 | 12/1998 | Senninger et al. . |

FOREIGN PATENT DOCUMENTS

| | | |
|---|---|---|
| 1165828A | 11/1997 | China . |
| 0 265 091 A1 | 4/1988 | European Pat. Off. . |
| 0 789 036 A2 | 8/1997 | European Pat. Off. . |
| 0 816 385 A1 | 1/1998 | European Pat. Off. . |
| 0 824 110 A1 | 2/1998 | European Pat. Off. . |
| 0 824 111 A1 | 2/1998 | European Pat. Off. . |
| 0 826 698 A1 | 3/1998 | European Pat. Off. . |
| 0 832 902 A2 | 4/1998 | European Pat. Off. . |
| WO 97/47661 | 12/1997 | WIPO . |
| WO 98/06758 | 2/1998 | WIPO . |
| WO 98/20050 | 5/1998 | WIPO . |

OTHER PUBLICATIONS

Owen W. Webster, "Living Polymerization Methods", Articles, Science, Feb. 22, 1991, pp. 887–893.

Simion Coca, et al, Polymerization of Acrylates by Atom Transfer Radical Polymerization. Homopolymerizatino of 2–Hydroxyethyl Acrylate, Journal of Polymer Science, Part A: Polymer Chemistry, vol. 36, 1417–1424 (1998), pp. 1417–1424.

C. Granel et al, "Controlled Radical Polymerization of Methacrylic Monomers In the Presnece of a Bis(ortho–chelated) Arylnickel(II) Complex and Different Activated Alkyl Halides", American Chemical Society, 1996, Advance ACS Abstracts, pp. 8576–8582.

Kryzsztof Matyjasxewki et al, Zerovalent Metals in Controlled/"Living" Radical Polymerization, Macromolecules, 1997, 30, 7348–7350.

Catherine Marestin et al, "Nitroxide Mediated Living Radical Polymerization of Styrene in Emulsion", Macromolecules 1998, 31, 4041–4044.

Jianhui Xia et al, "Controlled/"Living" Radical Polymerization. Homogeneous Rivers Atom Transfer Radical Polymerization using AIBN as the Initiator", Macromolecules 1997, 30, 7692–7696.

Stefan A.F. Bon et al, "Controlled Radical Polymerization in Emulsion", 1997, Macromolecules, 30, 324–326.

Tomotaka Nishikawa et al, "Evidence for Living Radical Polymerization of Methyl Methacrylate with Ruthenium Complex: Effects of Protic and Radical Compounds and Reinitiation From the Recovered Polymers", Macromolecules 1997, 30, 2244–2248.

Takayuki Makino et al, "Controled Atom Transfer Radical Polymerization os of Methyl Methacrylate Under Micellar Conditions", 288–289, 1997.

Polymer Letters, vol. 5, pp. 697–701, 1967, New Initiator Systems for Radical Polymerization of Vinyl Monomers, Takayuki Otsu et al.

Science, vol. 272, pp. 866–868, May 10, 1996, Polymers With Very Low Polydispersities From Atom Transfer Radical Polymerization, Timothy E. Patten et al.

Macromolecules, vol. 31, No. 12, 1998, pp. 4053–4056, Self–regulated Phase Transfer of $Cu_2O$/bpy, Cu(0)/bpy, and $Cu_2O$/Cu(0)/bpy Catalyzed "Living" Radical Polymerization Initiated with Sulfonyl Chlorides, V. Percec et al.

J. Chem. Soc. (B), pp. 255–259, Redox–Transfer, Part VI, Determination of Hammet's p–constant for the Oxidation of Cuprous Chloride by Aromatic Sulphonyl Chlorides, A. Orochov et al., 1968.

Asscher and Vofsi, pp. 4962–4971, Chlorine–Activation by Redox–Transfer, Part IV. The Addition of Sulphonyl Chlorides to Vinylic Monomers and Other Olefins, M. Asscher et al., 1964.

(List continued on next page.)

*Primary Examiner*—Samuel A. Acquah
*Attorney, Agent, or Firm*—Kirkpatrick & Lockhart LLP

[57] ABSTRACT

A process is provided for the preparation of (co)polymer emulsions or suspensions from a full range of free radically (co)polymerizable monomers, wherein the (co)polymers exhibit the characteristics of "living" polymerization, including one or more of predictable molecular weights, narrow or controllable molecular weight distributions and a variety of polymer architectures, including the roles of surfactants, catalyst and ligands, several initiation methods, and methods for catalyst removal from the emulsions or suspensions made, and the (co)polymer emulsions and suspensions made thereby.

40 Claims, No Drawings

OTHER PUBLICATIONS

J. Chem. Soc. Perkin Trans, 1991, pp. 627–633, Novel Perfluoroalkylation of Alkenes with Perfluoroalkanesulphonyl Chlorides Catalysed by a Ruthenium (II) Complex, Nobumasa Kamigata et al.

Macromolecules, vol. 28, No. 23, 1995, pp. 7970–7972, "Living" Radical Polymerization of Styrene Initiated by Arenesulfonyl Chlorides and $Cu^1(bpy)_nCl$, Virgil Percec et al.

Macromolecules, vol. 29, No. 10, 1996, pp. 3665–3668, Metal–Catalyzed "Living" Radical Polymerization of Styrene Initiated with Arenesulfonyl Chlorides. From Heterogeneous to Homogeneous Catalysis, Virgil Percec et al.

Chemical Abstracts, vol. 85, 1976, pp. 20.

Science, vol. 25, Feb. 22, 1991, pp. 887–893, Living Polymerization Methods, Owen W. Webster.

Journal of Polymer Science: Part A: Polymer Chemistry, vol. 36, 1417–1424, 1998, Polymerization of Acrylates by Atom Transfer Radical Polymerization. Homopolymerization of 2–Hydroxyethyl Acrylate, Simion Coca et al.

Macromolecules, vol. 29, No. 27, 1996, 8576–8582, Controlled Radical Polymerization of Methacrylic Monomers in the Presence of Bis(Ortho–Chelated) Arylnickel(II) Complex and Different Activated Alkyl Halides, C. Granel, et al.

Macromolecules, vol. 30, No. 23, 1997, 7348–7350, Zerovalent Metals in Controlled/"Living" Radical Polymerization, Krzysztof Matyjaszewski et al.

Macromolecules, vol. 31, No. 12, 1998, 4041–4044, Nitroxide Mediated Living Radical Polymerization of Styrene in Emulsion, Catherine Marestin et al.

Macromolecules, vol. 30, No. 25, 1997, 7692–7696, Controlled/"Living" Radical Polymerization. Homogeneous Reverse Atom Transfer Radical Polymerization Using AIBN as the Initiator, Jianhui Xia et al.

Macromolecules, vol. 30, No. 2, 1997, 324–326, Controlled Radical Polymerization in Emulsion, Stefan A.F. Bon et al.

Macromolecules, vol. 30, No. 8, 1997, 2244–2248, Evidence for Living Radical Polymerization of Methyl Methacrylate with Ruthenium Complex: Effects of Protic and Radical Compounds and Reinitiation From the Recovered Polymers, Tomotaka Nishikawa et al.

Controlled Atom Transfer Radical Polymerizations of Methyl Methacrylate Under Micellar Conditions, Takayuki Makino et al., pp. 288–289, 1997.

Part 2, Controlled "Living" Emulsion Polymerization of Methyl Methacrylate by Atom Transfer Radical Polymerization, pp. 90–134, 1997.

APPLICATION OF ATOM TRANSFER RADICAL POLYMERIZATION TO WATER-BORNE POLYMERIZATION SYSTEMS

BACKGROUND OF THE INVENTION

1. Field of Invention

The present invention relates to a process for the preparation of (co)polymers by controlled/"living" atom transfer radical polymerization in an emulsion or suspension, and the emulsions and suspensions prepared thereby.

2. Discussion of the Background

In order to obtain well defined polymers (with respect to characteristics such as predefined molecular weight, narrow molecular weight distribution, well defined end groups, composition and architecture), "living" or controlled chain growth polymerizations are often employed. Webster, O. *Science* 1991, 251, 887. These polymerizations are special in that chain breaking reactions, such as termination or transfer, are minimized such that their contribution to the overall polymerization is negligible. Such polymerizations are characterized by initiation where one initiator molecule generates, at most, one polymer chain and that all polymer chains grow at nearly the same time. This results in polymers whose number average molecular weight is defined by $M_n = MW_m * (\Delta[M]/[I]_o) + MW_{init}$, where $\Delta[M]$ is the concentration of consumed monomer, $[I]_o$ is the concentration of added initiator, $MW_m$ and $MW_{init}$ are the molar masses of the monomer and added initiator, respectively. The molecular weight distributions, defined as $MWD = M_w/M_n$, are generally narrow, with $MWD < 1.5$.

The first living polymerizations were those based on the ionic polymerization of vinyl monomers. Webster, O. *Science* 1991, 251, 887. Unfortunately, these types of polymerizations require the complete absence of water from the reaction mixture, and therefore, can not be conducted as emulsions or suspensions in water. Living polymerizations based on free radical mechanisms are only a recent development, as the ability of propagating radicals to react with one another (through combination, chain transfer or disproportionation for example) made reduction of termination reactions very difficult. Two current methods of "living"/controlled radical polymerization are TEMPO (2,2,6,6-tetramethyl-1-piperidinoxyl radical) mediated polymerizations [U.S. Pat. Nos. 4,581,429 and 5,322,912] and atom transfer radical polymerization (ATRP).[U.S. Pat. No. 5,763,548; Ser. Nos.: 09/034,187, 08/559,309, 08/677,828, 08/940,985, 09/018,554]

Nearly all controlled/"living" radical polymerizations, however, have been confined to bulk or solution polymerization. Although some polymerizations have been conducted in water, either as homogeneous (Coca, S., et al. *J. Polym. Sci., Polym. Chem. Ed.* 1998, 36, 1417) or biphasic mixtures, (Nishikawa, T. et al., *Macromolecules* 1997, 30, 2244.) the preparation of well-defined polymers by emulsion or suspension systems has not been reported. Both seeded (Bon, S. A. F. et al, *Macromolecules* 1997, 30, 324) and unseeded (Marestin, C. et al., *Macromolecules* 1998, 31, 4041.) emulsion polymerizations of styrene have been conducted with TEMPO-mediated polymerization systems, but TEMPO mediated polymerizations are generally successful only for polymerizations which predominately contain styrene, or derivatives of styrene, as monomers. Seeded emulsions are not desirable as the use of high molecular weight polymer as the seed will not conform to the same molecular weight of the final polymer and hence, introduce broader molecular weight distributions or differences in functionality. Also, TEMPO mediated polymerizations in general require the use of temperatures greater than 100° C., requiring the use of specialized equipment to conduct the polymerizations to high conversions. The use of ATRP in emulsions (Makino, T. et al., *Polym. Prepr.* (*Am. Chem. Soc., Div. Polym. Chem.*) 1998, 39(1), 288.) or suspensions (Granel, C. et al., *Macromolecules* 1996, 29, 8576.) has been reported but the resulting polymers were not well-defined as evidenced by broad molecular weight distributions and the theoretical molecular weights that did not correspond with predicted values ($DP_n = \Delta[M]/[I]_o$) nor did the molecular weights increase with conversion in a linear fashion. Other work previously reported to produce aqueous block copolymer dispersions and emulsions using azo macroinitiators (U.S. Pat. No. 5,741,845) also produces products with broad molecular weight distributions and no control over polymer architecture and end group functionalization.

Polymerizations carried out in heterogeneous systems, such as suspensions or emulsions in inorganic media are desirable for many reasons. By polymerizing organic monomers in water or $CO_2$ as the reaction medium, the use of volatile organic compounds in preparation, processing or application of the polymer can be reduced or eliminated; the continuous phase can better dissipate heat generated by the polymerization, allowing for the monomers to be polymerized in bulk, and may enhance the polymerization rate of some monomers; polymerization in an emulsion or suspension can result in a reduction of viscosity of the system at high monomer to polymer conversion and can produce products of direct interest in various applications.

DETAILED DESCRIPTION OF THE PREFERRED EMBODIMENTS

For the first time, (co)polymers from a full range of free radically (co)polymerizable monomers exhibiting the characteristics of "living" polymerization, i.e. predictable molecular weights and narrow, or controllable, molecular weight distributions, combined with the ability to prepare block, graft and comb shaped copolymers, and (hyper) branched copolymers, were produced in an emulsion system.

The stability of the emulsion can be tailored in the present process to allow for catalyst free recovery of the polymer or to produce stable emulsions or suspensions suitable for use in the production of paints, adhesives, impact modifiers, etc. Previous methods for the preparation of such polymers have depended on the use of chemistry and solvents which can be regarded as problematic in relation to environmental considerations and industrial hygiene. For this reason the present invention describes the preparation of dispersions or emulsions in inorganic media.

The invention relates to the preparation of well-defined polymeric materials, including polymers of predefined molecular weight, narrow molecular weight distribution, well-defined end groups, composition, and architecture, by radical polymerization in an emulsion or suspension system using an inorganic liquid as suspension medium, such as one using water as the suspension or dispersion medium. The preparation of such well-defined materials is highly desired as they have novel properties which can be designed so that the final properties of the bulk material are tailored to a specific application.

ATRP initiates controlled radical polymerization by reaction of the initiator, R—X, with a transition metal, $M_t^n$. The radically transferable atom or group, X, is abstracted by the metal center to form a higher oxidation state species, X—$M_t^{n+1}$, and the radical R., with R being any organic or inorganic molecule that can be present as a radical. The radical can then initiate polymerization, react with X—$M_t^{n+1}$ or terminate with another radical. When the radical reacts with monomer and propagates, the oligomeric radical will react with X—$M_t^{n+1}$ to form a polymer chain with the initiator fragment at one end and the radically transferable atom or group at the other end and a lower oxidation state metal. The lower oxidation state transition metal can then react with the radically transferable atom or group at the chain end to reinitiate polymerization. By repetition of this process, the polymer chain gradually grows in a controlled manner. Any termination of the radicals generates a small excess amount of X—$M_t^{n+1}$ which allows for faster reaction between the radicals and X—$M_t^{n+1}$. This process is summarized in Scheme 1.

Scheme 1

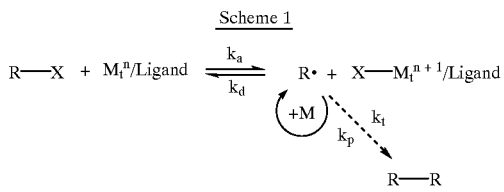

A special case of ATRP is where the transition metal is initially present as X—$M_t^{n+1}$ and reacts with radicals generated by a conventional radical initiator to generate $M_t^n$ and R—X in situ; this process is termed "reverse" ATRP. Another variation is in situ generation of the catalyst. This occurs when the transition metal is initially present as X—$M_t^{n+1}$ and reacts with a reducing agent, such as a zero valent metal, to generate $M_t^n$.

ATRP is disclosed in U.S. Pat. No. 5,763,548 and U.S. application Ser. Nos: 09/034,187; 08/559,309; 08/677,828; 08/940,985; and 09/018,554, the contents of which are hereby incorporated by reference.

The initiator can be any molecule containing a radically transferable atom or group, including macromolecules. When the initiator is a macroinitiator, any known method of polymerization or polymer modification can be used to form a suitable macroinitiator. The limitations described within the application for low molecular weight initiators will apply to macroinitiators. Initiators and macroinitiators can include the function of surfactant in the molecule.

Early experiments by the present inventors on the use of ATRP in an emulsion used sodium dodecyl sulfate as an emulsifier. The use of this surfactant generally led to the formation of very high molecular weight polymer with broad polydispersities. This is now believed to be attributable to the reaction of the transition metal compound copper (II) bromide (or chloride) with the sulfate anion to form copper (II) sulfate and sodium bromide. Thus, the growing radicals could not be deactivated, as the sulfate group is not capable of being transferred to the growing radical, and the polymerization behaved as if it were a conventional, redox initiated, radical polymerization. The components used in the ATRP reaction of the present invention, e.g., surfactant or solvent, should not interfere with either the catalyst or the radicals which are generated. Such interactions will cause side reactions which are detrimental to obtaining well-defined polymer.

The transition metal that is used can be any transition metal or transition metal compound that is initially in a lower oxidation state or is reduced to the lower oxidation state in early stages of the reaction, is complexed by a ligand and capable of interacting with the initiating species having a radically transferable atom or group, to reversibly generate a radical initiating species. The metal may be, but is not limited to, $Cu^{1+}$, $Cu^{2+}$, $Cu^0$, $Fe^{2+}$, $Fe^{3+}$, $Fe^0$, $Ru^{2+}$, $Ru^{3+}$, $Ru^0$, $Cr^{2+}$, $Cr^{3+}$, $Cr^0$, $Mo^{2+}$, $Mo^{3+}$, $Mo^0$, $W^{2+}$, $W^{3+}$, $Mn^{3+}$, $Mn^{4+}$, $Mn^0$, $Rh^{3+}$, $Rh^{4+}$, $Rh^0$, $Re^{2+}$, $Re^{3+}$, $Re^0$, $Pd^{2+}$, $Pd^0$, $Ni^{2+}$, $Ni^{3+}$, $Ni^0$, $Co^+$, $Co^{2+}$, $V^{2+}$, $V^{3+}$, $Zn^+$, $Zn^{2+}$, $Au^+$, $Au^{2+}$, $Ag^+$ and $Ag^{2+}$; preferred metals are $Cu^{1+}$, $Fe^{2+}$, $Ru^{2+}$, $Ni^{2+}$. Preferred catalyst compounds include Cu(I)Br, Cu(I)Cl, Cu(I)triflate, and Cu(II)triflate. Reverse ATRP can be conducted with transition metals that are in a higher oxidation state and which have a radically transferable atom or group as a counterion, preferred metal compounds for reverse ATRP are exemplified by $CuCl_2$, $CuBr_2$, $FeBr_3$, $FeCl_3$, $RuCl_3$, $RuBr_3$, $NiBr_3$. Most preferred catalysts for reverse ATRP include $Cu(II)Br_2$ and $Cu(II)Cl_2$. The lower transition state metal catalyst can be generated in situ by reaction of a more stable higher oxidation state metal compound with a reductant, such as metal zero. This is exemplified by the reaction of cupric triflate with copper (0) to form cuprous triflate, or similarly in the reduction of $Cu(II)Br_2$ to Cu(I)Br. Matyjaszewski, K. et al., *Macromolecules* 1997, 30, 7348.

A ligand must be used in conjunction with the transition metal. In a conventional ATRP polymerization conducted in bulk or in solution, the catalyst (transition metal or transition metal compound complexed by ligand(s)) should be at least partially soluble. However, in order to conduct the polymerization in a heterogeneous medium (where the monomer/polymer is insoluble, or only slightly soluble, in the suspension medium, i.e., water or $CO_2$), the catalyst, in both oxidation states, must be at least partially soluble in the monomer/polymer. To clarify this requirement that the catalyst should be preferentially soluble in the monomer/oligomer/polymer phase consider if the lower oxidation state is not soluble. Then initiation and/or reinitiation can not occur in the polymer/monomer droplet or micelle; the catalyst must be sufficiently soluble to be able to contact and react with the initiator/oligomer/polymer containing a radically transferable atom or group/radical. Should initiation not occur, then no polymerization would be observed. Conversely if the higher oxidation state metal complex is not soluble in the organic phase then deactivation of the growing radical does not occur, and the polymerization behaves as a conventional, redox initiated polymerization, yielding polymer with high molecular weights and broad molecular weight distributions. The most important factor to consider is keeping X—$M_t^{n+1}$ in the monomer/polymer phase. If this species is only soluble in the suspension medium, then efficient deactivation of the propagating radical can not occur.

Only when ligands are modified to allow the catalyst to meet these requirements of the reaction, such as use of ligands containing long alkyl chains to increase catalyst solubility in hydrophobic monomers targeted for polymerization, is a successful, controlled ATRP polymerization obtained in the water-borne systems of the present invention. For example, when the ligands 2,2'-bipyridyl (bpy),4,4'-di(t-butyl)-2,2'-bipyridyl(dTbpy),N,N,N',N'',N''-pentamethyldiethylenetriamine (PMDETA), or tris(2-dimethylaminoethyl)amine (TREN-Me) were used to complex with the catalyst, an uncontrolled polymerization was obtained; i.e., polymers with molecular weights higher than predicted and with broad molecular weight distributions were prepared. Only when ligands with long alkyl chains ($\geq 5$ carbons per chain preferably) to preferentially solubilize the catalyst in the organic phase, such as 4,4'-di (5-nonyl)-2,2'-bipyridyl (dNbpy), 4,4'-dialkyl-2,2'-bipyridyl (dAbpy, a mixture of 5-nonyl and n-pentyl alkyl chains), bis(2-bipyridylmethyl)octylamine and 4,4',4"-tris(5-nonyl)-2,2',6',2"-terpyridyl were the emulsion polymerizations successfully controlled, i.e., $DP_n=\Delta[M]/[I]_o$ and $M_w/M_n<1.5$. The use of dTbpy was successful when deactivator, e.g., Cu(II)Br$_2$, was added at the beginning of the polymerization, suggesting that the deactivator is only partially partitioned between the organic/water phases. These results show that the specific ligand must be chosen to meet the solubility requirements for controlled polymerization imposed by suspension medium, initiator, surfactant, other catalyst components and/or monomers/oligomers/polymers. Most preferred ligands include dNbpy, dAbpy, dTbpy, bis(2-pyridylmethyl) octylamine and 4,4',4"-tris(5-nonyl)-2,2',6',2"-terpyridyl.

A key component in the preparation of the stable emulsions of the present process is the use of a surfactant to stabilize the initial monomer suspension/emulsion and growing polymer particles and to prevent unwanted coagulation/flocculation of the particles. In order to conduct ATRP in an emulsion however, one must choose a surfactant which does not interfere with the catalyst or dormant chain end. Reaction of the surfactant with the catalyst would either prevent initiation and hence polymerization from occurring (catalyst in the lower oxidation state) or prevent deactivation of the growing radicals (catalyst in the higher oxidation state), and thus lead to an uncontrolled polymerization. Additionally, the surfactant could react with the dormant chain ends and displace the radically transferable atom or group; such a reaction would prevent the polymerization from re-initiating and would result in a decrease in the rate of polymerization with time. Suitable surfactants include non-ionic, anionic, and cationic surfactants, with cationic and non-ionic surfactants being preferred in non-buffered solutions. Particularly preferred non-ionic surfactants include polyethylene glycol, the polyoxyethylene oleyl ethers (ICI's Brij® surfactants) and the polyoxythylene sorbitan monoakyls (ICI's Tween® surfactants). After gaining an understanding of the complex interactions we then re-examined the use of ionic surfactants and chose the cationic surfactant, dodecyl trimethyl ammonium bromide (DTMAB). This was successfully used in a controlled free radical emulsion polymerization. This demonstrates that the use of ionic surfactants is possible, as long as the surfactant does not react with the catalyst or polymer chain end. Such undesirable side reactions cause the polymerization to behave as an uncontrolled redox initiated water-borne polymerization. Such interference was not observed for the specific cationic surfactant chosen. This would indicate that interactions between the surfactant and all components of the catalyst must be considered, however within the limitations of ATRP disclosed in our other applications this allows for a broad range of options. It was also observed that regardless of the surfactant that was used, efficient stirring was necessary to obtain good dispersions or latexes. Most preferred surfactants include Tween 80, Brij 98 and dodecyltrimethylammonium bromide.

The present process uses one or more radically (co) polymerizable monomers. Various monomers have been successfully polymerized using ATRP in water-borne systems as shown in the examples below. It was found that these exemplifying monomers, which are a selection of the monomers that have been demonstrated to be polymerized by ATRP in bulk or in organic solutions, were also successfully polymerized in the heterogeneous systems although the exact reaction conditions varied from monomer to monomer, i.e., surfactant, polymerization temperature, etc. The emulsions were successfully conducted with a monomer concentration of up to 50% solids. This occurred in the non-optimal laboratory conditions of a magnetically stirred round bottomed flask and indicate that higher % solids are feasible in specially designed equipment. While any radically (co) polymerizable monomer can be used, most preferred are n-butyl methacrylate, methyl methacrylate, butyl acrylate, styrene, and 2-hydroxyethyl acrylate.

The requirements for the initiator used in these successful emulsion polymerizations by ATRP are similar to those for ATRP in bulk monomer or organic solvents: the initiator must contain at least one radically transferable atom or group. High solubility in the suspension medium is not a prerequisite for emulsion initiators as demonstrated by the use of the poorly water soluble ethyl 2-bromoisobutyrate, to initiate the emulsion polymerizations. While any order of addition of the initiator and other reaction components can be used, the order of addition of the initiator to the initial system can have an effect on the stability of the final mixture. If the initiator is introduced to the system already mixed with the monomer, coagulation of the polymer is often observed. However, if the initiator is added to a pre-emulsified reaction mixture, stable latexes are usually obtained. Suitable initiators include ethyl 2-bromoisobutyrate, methyl 2-bromopropionate, 2-hydroxyethyl 2-bromoisobutyrate, α-bromopropionitrile, ethyl 2-chloroisobutyrate, methyl 2-chloropropionate, 2-hydroxyethyl 2-chloroisobutyrate, α-chloropropionitrile, and 2-bromoisobutyric acid. Suitable initiators for reverse ATRP include potassium persulfate, 2,2-azobis(2-amidopropane)dihydrogen chloride and 2,2'-azobis(2-methylpropionamidine)dihydrochloride.

The initiators can also be macromolecules that contain radically transferable atoms or groups. Such initiators can be added pre-formed or prepared in-situ and be used to prepare block and/or graft and comb (co)polymers. A special type of macroinitiator would be one that was water soluble, or even amphiphilic. After initiation of the ATRP reaction, the macroinitiator would be incorporated into the polymer particle and can stabilize the growing particle due to the hydrophilic segment of the macroinitiator.

Additionally, radical initiators used in non-controlled emulsion systems could be used to generate both the initiator and active ATRP catalyst in situ. This is simply an extension of the reverse ATRP systems performed in bulk monomer or organic solution (Xia, J. et al., *Macromolecules* 1997, 30, 7692.) to suspension, dispersion and emulsion polymerization. An example is use of the azo radical initiator 2,2'-Azobis(2-methylpropionamidine)dihydrochloride (AMPA). Unlike the prior art of U.S. Pat. No. 5,741,845, whose azo macroinitiators are hereby incorporated in this application, use of such azo initiators in "reverse" ATRP leads to controlled polymerization of the free radically polymerizable monomer on the macroinitiator with the blocks and/or grafts having a predetermined molecular weight and each captured initiator group leading to a graft or block with a known end group. AMPA which was used to exemplify this approach also generates conventional free radicals by thermal decomposition. As described in other applications these radicals could directly initiate the polymerization of the monomer, either in the aqueous phase or in micelles, which would then react with the metal complex in its higher oxidation state, that had radically transferable atoms or groups, and ligands, e.g., L$_2$Cu(II)Br$_2$. The reaction of the radical with such a species would generate an oligomeric chain with the radically transferable atom or group at a chain end, and the lower oxidation state metal center. Alternatively the free radical could react directly with the higher oxidation state metal forming an ATRP initiator and lower oxidation state catalyst. In either manner, such a system can be used for the polymerization of a wide variety of monomers and can be applied to all metal centers which are used for ATRP. As an example, the use of the AMPA/Cu(II)Br$_2$ initiator system results in emulsions with smaller particle sizes than for the ethyl 2-bromoisobutyrate/Cu(I)Br system (100 nm vs. 1000 nm). Thus demonstrating that by adjusting the reaction conditions it possible to attenuate the final particle size of the latex.

In these polymerizations, the observed molecular weights are higher than predicted, but yet still have relatively low polydispersities (Mw/Mn<1.5). This would indicate that the initiating efficiency of the initiator is less than 1; some proportion of the radicals terminate, presumably in the aqueous phase, prior to reacting with the higher oxidation state transition metal. Because of the low polydispersity, it can be concluded that the termination occurs at very low conversion of monomer, and once the ATRP process begins to dominate, has very little bearing on the final polymer. In addition, the conventional radical initiator, potassium persulfate can be used as the initiator for the reverse ATRP emulsions. However, for this initiator to be successfully used, it was required that a buffered aqueous solution be employed for the suspension medium.

With these teachings it is now possible to prepare various types of materials or polymers based on controlled free radical polymerization of monomers as emulsions. Statistical copolymers can be prepared by simply copolymerizing two or more monomers simultaneously. A special class of copolymers, gradient copolymers, can be formed as well. These polymers have gradually changing monomer compositions along the polymer chain. Such materials are produced from two or more monomers as the result of differences in the reactivity ratios of the monomers that are being simultaneously copolymerized. Additionally, one or more monomers can be added to the reaction mixture at controlled rates, thus governing the relative concentrations of the monomers in the reaction. Such additions of monomer(s) can be by injection of the neat monomer(s) or as a second emulsion of the monomer(s). This allows for some monomers to be preferentially incorporated, relative to the others, into the polymer chain as a result of controlled concentration in addition to initial concentration and reactivity ratios.

Block copolymers can be prepared by using a pre-formed macroinitiator to initiate the polymerization. Also, sequential addition of monomer can be used to prepare block copolymers. That is, upon the consumption of all or most of a first monomer, a second monomer is added which is then added to the polymer chain. Use of telechelic initiators lead to ABA block copolymers directly while monofunctional initiators lead to AB block copolymers. If all of the first monomer is not completely consumed prior to the addition of the second monomer, then there is a small gradient in the polymer chain until all of the first monomer is consumed and only the second monomer remains. Such materials can possess properties resulting from the tailored microdomain interface that are different from conventional block copolymers without a gradient and are potentially useful for many blending and energy absorbing applications. Blocks of more than two monomers can be prepared by successive addition, i.e., CBABC and ABC block copolymers can be prepared by addition of a third monomer after consumption of the second, and so on.

Branched and hyperbranched polymers can be prepared by (co)polymerization of AB* monomers. Such monomers have a polymerizable double bond (A) and a functional group that can initiate ATRP (B*), e.g. a radically transferable atom or group.

Telechelic/End functional polymers can be prepared by using of an initiator that has two or more radically transferable atoms or groups. Thus the polymer chain will grow in more than one direction and, depending on the radically transferable atom or group employed, can be used as obtained at the end of the polymerization or can be modified by known chemistries to obtain the desired functionality. Another route to functional polymers is to use low molecular weight initiators that contain a functional group, e.g., 2-hydroxyethyl 2-bromoisobutyrate. Also, macroinitiators that contain functional groups, i.e., poly(2-hydroxyethyl acrylate) or poly(dimethylaminoethyl methacrylate), can be used.

Comb shaped polymers can be prepared from macroinitiators that contain a free radically transferable atom or group on each monomer unit, or regularly along the polymer chain, such that the branches or grafts are forced to physically interact at a molecular level. The preparation of such materials in an emulsion will profoundly affect the properties of a coating formed by deposition of the emulsion on a surface.

Based on the principles detailed above, it is also possible to perform a water-in-oil emulsion/suspension controlled radical (co)polymerization. This type of emulsion is where the monomer/polymer is water soluble and the continuous phase is an organic solvent (oil). Again, the catalyst should be chosen so that it is preferentially soluble in the monomer/polymer but not in the continuous phase. This is accomplished by variation of the ligands, e.g. those ligands which were not successful for water borne emulsions and suspensions should work well in water-in-oil emulsion/suspensions.

Thus, the full range of materials capable of synthesis by ATRP, disclosed in U.S. Pat. No. 5,763,548 and U.S. application Ser. Nos.: 09/034,187; 08/559,309; 08/677,828; 08/940,985; and 09/018,554 can be prepared in emulsion or suspension systems and are hereby incorporated.

If desired, removal of the transition metal catalyst can be accomplished by addition of an ion exchange resin. This was demonstrated by use of DOWEX resin MSC-1 to remove the copper catalyst from the bulk polymerization of styrene. At the conclusion of the polymerization, the polymer was dissolved in acetone, the resin added and the mixture stirred. The color of the solution went from dark green to colorless, indicating that the copper was no longer in solution. Filtration of the resin through filter paper, and evaporation of the solvent resulted in the isolation of pristine polymer. It was observed that solvents with higher polarity were more effective in removing the catalyst; addition of small amounts of water were observed to enhance the rate of absorption of the catalyst onto the resin.

Use of the ion exchange resin also successfully removed the catalyst from emulsion polymerizations. Similar to the bulk polymerization described above, at the end of the emulsion polymerization, the DOWEX resin was added to the reaction and stirred for a period of time until the color of the latex changed from green to white and the resin was easily removed by filtration. Precipitation of the white latex into methanol yielded pristine polymer.

EXAMPLES

Example 1

General Procedure for Table 1: Surfactant, ligand, and transition metal were all added to a round bottom flask equipped with a magnetic stir bar, and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

flask with a stir bar, 11.3 mg of $CuBr_2$ (0.051 mmol), 35.5 mg of dAbpy (0.093 mmol) and 0.2 g of Brij 98 (2% v. water) were added and degassed under vacuum-nitrogen cycle for three times. 1.5 ml of degassed BMA (9.4 mmol) was added to the flask via syringe. The mixture was stirred until the solution became homogeneous. 10 ml of degassed water containing 6.4 mg (0.024 mmol) of AMPA (2,2'-Azobis(2-methylpropionamidine)dihydrochloride) was then

TABLE 1

ATRP Emulsion Polymerization using Poly(Ethylene Glycol) as the Surfactant[a]

| Reference | Monomer | Initiator | Catalyst | Ligand | Surfactant | Water | Time | $M_{n,SEC}$ | $M_w/M_n$ |
|---|---|---|---|---|---|---|---|---|---|
| BA-8 | BA, 2.5 ml (17 mmol) | EBiB, 12.8 µl (0.087 mmol) | CuBr, 12.5 mg (0.087 mmol) | dNbpy, 71.3 mg (0.174 mmol) | PEG (1000), 1 g | 10 ml | 1 hr<br>4.3 hr<br>22 hr | 9 821<br>13 430<br>19 270 | 1.12<br>1.11<br>1.18 |
| BA-9 | BA, 2.5 ml (17 mmol) | EBP, 11.3 µl (0.087 mmol) | CuBr, 12.5 mg (0.087 mmol) | dNbpy, 71.3 mg (0.174 mmol) | PEG (1000), 1 g | 10 ml | 1 hr<br>4.3 hr<br>22 hr | 11 480<br>14 530<br>20 260 | 1.21<br>1.16<br>1.19 |
| BA-10 | BA, 2.5 ml (17 mmol) | EBP, 11.3 µl (0.087 mmol) | CuBr, 12.5 mg (0.087 mmol) | dNbpy, 71.3 mg (0.174 mmol) | PEG (1000), 0.5 g | 10 ml | 1 hr<br>4.3 hr<br>22 hr | 12 160<br>16 600<br>22 800 | 1.18<br>1.16<br>1.17 |
| BA-11 | BA, 2.5 ml (1.7 mmol) | EBP, 11.3 µl (0.087 mmol) | CuBr, 12.5 mg (0.087 mmol) | dNbpy, 71.3 mg (0.174 mmol) | PEG (1000), 1 g | 10 ml | 70 min<br>4.2 hr<br>11 hr<br>22 hr | 15 000<br>16 540<br>21 200<br>21 750 | 1.27<br>1.21<br>1.15<br>1.18 |
| BMA-1 | BMA, 2.5 ml (15.7 mmol) | EBiB, 11.5 µl (0.079 mmol) | CuBr, 11.3 mg (0.079 mmol) | dNbpy, 64.2 mg (0.157 mmol) | PEG (4600), 1 g | 10 ml | 1 hr | 23 010 | 1.20 |
| BMA-2 | BMA, 2.5 ml (15.7 mmol) | EBiB, 11.5 µl (0.079 mmol) | CuBr, 11.3 mg (0.079 mmol) | dNbpy, 64.2 mg (0.157 mmol) | PEG (1000), 1 g | 10 ml | 30 min | 23 250 | 1.21 |
| BMA-3 | BMA, 1.5 ml (9.4 mmol) | EBiB, 6.9 µl (0.047 mmol) | CuBr, 6.8 mg (0.047 mmol) | dNbpy, 38.4 mg (0.094 mmol) | PEG (4600), 134 mg | 10 ml | 16 min<br>20 min<br>45 min | 17 790<br>25 460<br>26 030 | 1.21<br>1.61<br>1.22 |
| BMA-4 | BMA, 1.5 ml (9.4 mmol) | EBiB, 6.9 µl (0.047 mmol) | CuBr, 6.8 mg (0.047 mmol) | dNbpy, 38.4 mg (0.094 mmol) | PEG (4600), 1 g | 10 ml | 20 min<br>40 min<br>70 min | 25 200<br>27 760<br>28 280 | 1.40<br>1.51<br>1.19 |
| BMA-5 | BMA, 3 x 0.5 ml (9.4 mmol) | EBiB, 3.5 µl (0.024 mmol) | CuBr, 6.8 mg (0.047 mmol) | dNbpy, 38.4 mg (0.094 mmol) | PEG (4600), 1 g | 10 ml | 45 min<br>2 hr<br>3.5 hr | 40 140<br>41 340<br>55 120 | 2.09<br>2.56<br>1.81 |
| BMA-6 | BMA, 1.5 ml (9.4 mmol) | EBiB, 6.9 µl (0.047 mmol) | CuBr, 6.8 mg (0.047 mmol) | dNbpy, 38.4 mg (0.094 mmol) | PEG (1000), 16.8 mg | 10 ml | 16 min<br>20 min<br>50 min | 21 980<br>22 940<br>29 910 | 1.25<br>1.26<br>1.27 | i. All polymerizations conducted at 90° C.

Example 2

General Procedure for Table 2: Surfactant, ligand, and transition metal were all added to a round bottom flask equipped with a magnetic stir bar, and transition metal were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

Example 3

Reverse ATRP of Butyl Methacrylate (BMA) Using a Conventional Radical Initiator: To a 25 ml round bottom added to the flask. The mixture was stirred until an emulsified mixture was obtained. A 1 ml of sample was taken through syringe and mixed with 8 ml of THF. This sample was used as a reference for GC analysis at t=0. The flask was placed in an oil bath of 90 C. At timed intervals, 1 ml of sample was withdrawn and diluted with 8 ml of THF. Monomer conversion was measured by injecting the THF diluted sample directly into GC. The same sample was dried over $MgSO_4$ and purified by passing through an alumina column to remove the copper complex. After filtered through a 0.45 m syringe filter, the sample was injected into GPC for molecular weight analysis.

| Temp. (° C.) | Time | Conversion | $M_{n,th}$ | $M_{n,sec}$ | $M_w/M_n$ |
|---|---|---|---|---|---|
| 90 | 3 hr. | 93% | 26,450 | 78,150 | 1.24 |

Initiator efficiency = 0.34.

TABLE 2

ATRP Emulsion Polymerization using Brij ® as the Surfactant[a]

| Reference | Monomer | Initiator | Catalyst | Ligand | Surfactant | Water | Time | Conv (%) | $M_{n,th}$ | $M_{SEC}$ | $M_w/M_n$ |
|---|---|---|---|---|---|---|---|---|---|---|---|
| BMA-7 | BMA, 1.5 ml (9.4 mmol) | EBiB, 6.9 μl (0.047 mmol) | CuBr, 6.8 mg (0.047 mmol) | dNbpy, 38.4 mg (0.094 mmol) | Brij 97, 0.5 g | 10 ml | 25 min | 90 | 25 450 | 22 860 | 1.24 |
|  |  |  |  |  |  |  | 40 min | 85 | 24 220 | 26 750 | 1.25 |
|  |  |  |  |  |  |  | 60 min |  |  | 28 380 | 1.23 |
| BMA-Kinetics | [b]BMA, 3.0 ml (18.8 mmol) | EBiB, 19 μl (0.094 mmol) | CuBr, 13.6 mg (0.094 mmol) | dAbpy, 66mg[d] 66 mg[d] (0.188 mmol) | Brij 98, 0.2 g | 20 ml | 15 min | 48 | 13 600 | 17 300 | 1.21 |
|  |  |  |  |  |  |  | 30 min | 54 | 15 300 | 22 300 | 1.21 |
|  |  |  |  |  |  |  | 45 min | 69 | 19 600 | 24 400 | 1.21 |
|  |  |  |  |  |  |  | 60 min | 76 | 21 600 | 28 200 | 1.17 |
|  |  |  |  |  |  |  | 90 min | 80 | 22 700 | 30 800 | 1.19 |
|  |  |  |  |  |  |  | 120 min | 95 | 27 000 | 33 300 | 1.19 |
| BMA-8 | BMA, 1.5 ml (9.4 mmol) | EBiB, 6.9 μl (0.047 mmol) | CuBr, 6.8 mg (0.047 mmol) | dNbpy, 38.4 mg (0.094 mmol) | Brij 98, 0.5 g | 10 ml | 26 min | 70 | 19 820 | 26 240 | 1.23 |
|  |  |  |  |  |  |  | 45 min | 83 | 23 550 | 29 190 | 1.30 |
|  |  |  |  |  |  |  | 75 min | 89 | 25 200 | 33 950 | 1.29 |
| BMA-9 | BMA, 1.5 ml (9.4 mmol) | EBiB, 6.9 μl (0.047 mmol) | CuBr, 6.8 mg (0.047 mmol) | dNbpy, 38.4 mg (0.094 mmol) | Brij 98, 0.1 g | 10 ml | 70 min | 81 | 22 890 | 28 170 | 1.26 |
| BMA-10 | BMA, 1.5 ml (9.4 mmol) | EBiB, 6.9 μl (0.047 mmol) | CuBr, 6.8 mg (0.047 mmol) | dNbpy, 38.4 mg (0.094 mmol) | Brij 98, 0.2 g | 10 ml | 75 min | 81 | 24 170 | 32 290 | 1.28 |
| BMA-11 | BMA, 1.5 ml (9.4 mmol) | EBiB, 6.9 μl (0.047 mmol) | CuBr, 6.8 mg (0.047 mmol) | dNbpy, 38.4 mg (0.094 mmol) | Brij 98, 0.3 g | 10 ml | 12 min | 48 | 13 600 | 17 800 | 1.22 |
|  |  |  |  |  |  |  | 25 min | 59 | 16 800 | 21 900 | 1.21 |
|  |  |  |  |  |  |  | 37 min | 67 | 19 100 | 24 000 | 1.24 |
|  |  |  |  |  |  |  | 50 min | 74 | 21 100 | 26 500 | 1.22 |
|  |  |  |  |  |  |  | 65 min | 78 | 22 100 | 29 600 | 1.19 |
|  |  |  |  |  |  |  | 80 min | 82 | 23 400 | 30 200 | 1.22 |
| BMA-13 | BMA, 5.0 ml (31.3 mmol) | EBiB, 6.9 μl (0.047 mmol) | CuBr, 6.8 mg (0.047 mmol) | dNbpy, 38.4 mg (0.094 mmol) | Brij 98, 0.15 g | 10 ml | 130 min | 67 | 62 760 | 64 950 | 1.29 |
| BMA-14 | BMA, 2.4 ml (15.1 mmol) | EBiB, 2.8 μl (0.019 mmol) | CuBr, 2.7 mg (0.019 | dNbpy, 15.4 mg (0.038 mmol) | Brij 98, 0.8 g | 16 ml | 135 min | 76 | 85 890 | 98 340 | 1.73 |
| BMA-15 | BMA, 3 ml (18.8 mmol) | EBiB, 13.8 μl (0.094 mmol) | CuBr, 2.7 mg (0.019 mmol) | dAbpy, 71.6 mg[d] | none | none | 12 min | 51 | 14 400 | 18 000 | 1.92 |
|  |  |  |  |  |  |  | 24 min | 63 | 18 000 | 18 600 | 1.62 |
|  |  |  |  |  |  |  | 37 min | 72 | 20 400 | 19 000 | 1.36 |
|  |  |  |  |  |  |  | 48 min | 74 | 21 000 | 19 700 | 1.30 |
|  |  |  |  |  |  |  | 70 min | 75 | 21 300 | 20 100 | 1.30 |
| BMA-16 | BMA, 1.5 ml (9.4 mmol) | KPS, 6.2 mg (0.023 mmol) | CuBr, 8.6 mg (0.039 mmol) | dAbpy, 27.1 mg[d] | Brij 98, 0.3 g | 10 ml | 20 h | No Polymer |  |  |  |
| BMA-18 | [b]BMA, 20 ml | EBiB, 93 μl | CuBr, 13.6 ml | dAbpy, 66 mg[d] | Brij, 98, 0.5 g | 20 ml | 3 h |  |  | 15 800 | 1.32 |
| BMA-19 | [b]BMA, 3 ml | EBiB, 14 μl | CuBr, 13.6 ml | bpy, 29.4 mg (0.188 mmol) | Brij 98, 1.0 g | 20 ml | 3 h | 100 | 28 400 | 272 000 | 3.27 |
| BMA-20 | [b]BMA, 3 ml | EBiB, 14 μl | CuBr, 13.6 ml | 3N, 20 μl (0.094 mmol) | Brij 98, 1.0 g | 20 ml | 3 h | 100 | 28 400 | 3 800 00 | 6.7 |
| BMA-21 | [b]BMA, 3 ml | EBiB, 14 μl | CuBr, 13.6 ml | Mc6-TREN, 26 μl (0.094 mmol) | Brij 98, | 20 ml | 3 h | 100 | 28 400 | 9 800 000 | 3.8 |
| BMA-29 | BMA, 1.5 ml (9.4 mmol) | EBiB, 6.9 μl (0.047 mmol) | CuBr, 6.8 mg (0.047 mmol) | dAbpy, 35.8 mg[d] | DTMAB[c] 0.5 g | 10 ml | 5 min | 31 | 8 800 | 9 200 | 1.30 |
|  |  |  |  |  |  |  | 30 min | 51 | 14 500 | 16 300 | 1.26 |
|  |  |  |  |  |  |  | 60 min | 64 | 18 200 | 21 200 | 1.24 |
| Block-1 | [b]BMA, 3.0 ml (18.8 mmol) | EBiB, 19 μl (0.94 mmol) | CuBr, 13.6 mg (0.094 mmol) | dAbpy, 66 mg[d] (0.188 mmol) | Brij 98, 0.5 g | 20 ml | 140 min | 100 |  | 34 400 | 1.25 |
|  | Sty, 3.0 ml | — | — | — | Brij 98, 1.0 g | 20 ml |  |  |  |  |  |
| MMA | MMA, 1.5 ml (14.0 mmol) | EBiB, 9.2 μl (0.07 mmol) | CoBr, 5 mg (0.035 mmol) CuBr$_2$, 8 mg (0.004 mmol) | dAbpy,[d] 26.6 mg (0.07 mmol) | Brij 98, 0.5 g | 10 ml | 3.5 | 90 | 17 300 | 23 400 | 1.36 |
| Sty-1 | Sty, 1.5 ml (13.1 mmol) | EBiB, 9.6 μl (0.066 mmol) | CuBr, 9.4 mg (0.066 mmol) | dAbpy,[d] 49.8 mg (0.131 mmol) | Brij 98, 0.2 g | 10 ml | 7.6 h |  |  | 4 800 | 1.06 |
|  |  |  |  |  |  |  | 20.5 h |  |  | 10 699 | 1.07 |

TABLE 2-continued

ATRP Emulsion Polymerization using Brij ® as the Surfactant[a]

| | | | | | | | | Results | | | |
|---|---|---|---|---|---|---|---|---|---|---|---|
| Reference | Monomer | Initiator | Catalyst | Ligand | Surfactant | Water | Time | Conv (%) | $M_{n,th}$ | $M_{SEC}$ | $M_w/M_n$ |
| Sty-2 | Sty, 1.5 ml (13.1 mmol) | EBiB, 9.6 µl (0.066 mmol) | CuBr, 9.4 mg (0.066 mmol) | dAbpy,[d] 49.8 mg (0.131 mmol) | Tween 80, 0.3 g | 10 ml | 20.5 h | 66 | 13 750 | 12 820 | 1.06 |
| BA | BA, 1.5 ml (10.5 mmol) | EBiB, 7.7 µl (0.053 mmol) | CuBr, 7.5 mg (0.053 mmol) | dAbpy,[d] 40.0 mg (0.105 mmol) | Brij 98, 0.2 g | 10 ml | 1.2 h | 57 | 14 500 | 10 900 | 1.19 |
| | | | | | | | 4.0 h | 78 | 20 000 | 16 100 | 1.13 |
| | | | | | | | 20.3 h | 94 | 24 200 | 20 400 | 1.14 |

[a]All polymerizations conducted at 90° C., unless noted.
[b]Polymerization conducted at 70° C.
[c]Dodecyltrimethylammonium bromide
[d]dAbpy = 4,4'-di(alkyl)-4,4'-bipyridine, alkyl group is a mixture of $C_5$ and $C_9$ alkyl chains.

Example 4

Reverse ATRP of BA Using a Conventional Radical Initiator: To a 25 ml round bottom flask with a stir bar, 8.9 mg of $CuBr_2$ (0.040 mmol), 29.9 mg of dAbpy (0.079 mmol) and 0.2 g of Brij® 98 (2% v. water) were added and degassed under vacuum-nitrogen cycle for three times. 1.5 ml of degassed BA (10.5 mmol) was added to the flask via syringe. The mixture was stirred until the solution became homogeneous. 10 ml of degassed water containing 7.3 mg (0.027 mmol) of AMPA was then added to the flask. The mixture was stirred until an emulsified mixture was obtained. A 1 ml of sample was taken through syringe and mixed with 8 ml of THF. This sample was used as a reference for GC analysis at t=0. The flask was placed in an oil bath of 90 C. At timed intervals, 1 ml of sample was withdrawn and diluted with 8 ml of THF. Monomer conversion was measured by injecting the THF diluted sample directly into GC. The same sample was dried over $MgSO_4$ and purified by passing through an alumina column to remove the copper complex. After filtered through a 0.45µ syringe filter, the sample was injected into GPC for molecular weight analysis.

| Temp. (° C.) | Time | Conversion | $M_{n,th}$ | $M_{n,sec}$ | $M_w/M_n$ |
|---|---|---|---|---|---|
| 90 | 18.75 hr. | 72% | 17,940 | 10,520 | 1.21 |

Example 5

Emulsion ATRP of BMA using 2-Bromoisobutyric Acid as Initiator: To a 25 ml round bottom flask with a stir bar, 7.1 mg of CuBr (0.049 mmol), 35.2 mg of dAbpy (0.092 mmol) and 0.2 g of Brij® 98 (2% v. water) were added and degassed under vacuum-nitrogen cycle for three times. 1.5 ml of degassed BMA (9.4 mmol) was added to the flask via syringe. The mixture was stirred until the solution became homogeneous. 10 ml of degassed water containing 31.8 mg (0.19 mmol) of BIBA (2-bromoisobutyric acid) was then added to the flask. The mixture was stirred until an emulsified mixture was obtained. A 1 ml of sample was taken through syringe and mixed with 8 ml of THF. This sample was used as a reference for GC analysis at t=0. The flask was placed in an oil bath of 90 C. At timed intervals, 1 ml of sample was withdrawn and diluted with 8 ml of THF. Monomer conversion was measured by injecting the THF diluted sample directly into GC. The same sample was dried over $MgSO_4$ and purified by passing through an alumina column to remove the copper complex. After filtered through a 0.45µ syringe filter, the sample was injected into GPC for molecular weight analysis. Initiator efficiency= 0.15.

| Temp. (° C.) | Time | Conversion | $M_{n,th}$ | $M_{n,sec}$ | $M_w/M_n$ |
|---|---|---|---|---|---|
| 90 | 2 hr. | 75% | 5,280 | 35,480 | 1.23 |

Example 6

Emulsion ATRP of BMA using 2-Bromoisobutyric Acid as Initiator: To a 25 ml Schlenk flask with a stir bar, 18.8 mg of CuBr (0.13 mmol), 99.7 mg of dAbpy (0.26 mmol) and 0.5 g of Brij® 98 (5% v. water) were added and degassed under vacuum-nitrogen cycle for three times. 1.5 ml of degassed Sty (13.1 mmol) was added to the flask via syringe. The mixture was stirred until the solution became homogeneous. 10 ml of degassed water containing 22.5 mg (0.13 mmol) of BIBA was then added to the flask. The mixture was stirred until an emulsified mixture was obtained. A 1 ml of sample was taken through syringe and mixed with 8 ml of THF. This sample was used as a reference for GC analysis at t=0. The flask was placed in an oil bath of 90 C. At timed intervals, 1 ml of sample was withdrawn and diluted with 8 ml of THF. Monomer conversion was measured by injecting the THF diluted sample directly into GC. The same sample was dried over $MgSO_4$ and purified by passing through an alumina column to remove the copper complex. After filtered through a 0.45µ syringe filter, the sample was injected into GPC for molecular weight analysis. Initiator efficiency= 0.34.

| Temp. (° C.) | Time | Conversion | $M_{n,th}$ | $M_{n,sec}$ | $M_w/M_n$ |
|---|---|---|---|---|---|
| 90 | 40.5 hr. | 82% | 8,300 | 43,460 | 1.23 |

Example 7

Comparison of Various Ligands: To a round bottom flask equipped with a magnetic stir bar, surfactant, ligand, and transition metal (all with ratio water/monomer/metal/ligand/initiator=1333/200/1/2/1) were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

| Ligand | Brij ® 98 | Ref. | Temp. | Time | Conv. | $M_{n,th}$ | $M_{n,sec}$ | $M_w/M_n$ |
|---|---|---|---|---|---|---|---|---|
| dNbipy | 2% | BMA-10 | 90 | 75 min | 85% | 24,170 | 32,290 | 1.28 |
| Bpy | 5% | BMA-19 | 70 | 180 min | 100% | 28,400 | 272,000 | 3.3 |
| 3N | 5% | BMA-20 | 70 | 180 min | 100% | 28,400 | 3,800,000 | 6.7 |
| TREN-Me | 5% | BMA-21 | 70 | 180 min | 100% | 28,400 | 9,800,000 | 3.8 |
| dAbpy | 2% | BMA-22 | 90 | 100 min | 89% | 25,310 | 37,150 | 1.33 |
|  | 2% | BMA-23 | 70 | 105 min | 88% | 25,030 | 33,980 | 1.25 |
| dTbpy | 2% | BMA-30 | 70 | 113 min | 91% | 25,880 | 32,330 | 2.03 |
| dTbpy | 2% | BMA-31' | 70 | 108 min | 93% | 26,450 | 33,800 | 1.39 |

1. with 8% of $CuBr_2$ (vs. Cu total) added

Example 8

Comparison of Monomer to Water Ratio: To a round bottom flask equipped with a magnetic stir bar, surfactant (wt % relative to water), ligand, and transition metal (all with ratio monomer/metal/ligand/initiator=200/1/2/1, except BMA-15: 600/1/2/1) were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

Example 9

Comparison of Surfactant to Water Ratio: To a round bottom flask equipped with a magnetic stir bar, surfactant (wt % relative to water), ligand, and transition metal (all with ratio water/monomer/metal/ligand/initiator=1333/200/1/2/1) were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

Monomer/water ratio (volume)

|  | Brij ® 98 | Ref. | Temp. | Time | Conv. | $M_{n,th}$ | $M_{n,sec}$ | $M_w/M_n$ |
|---|---|---|---|---|---|---|---|---|
| 0.15/1 | 2% | BMA-23 | 70 | 105 min | 88% | 25,030 | 33,980 | 1.25 |
| 2/1 | 1.5% | BMA-13 | 90 | 130 min | 66% | 62,760 | 64,950 | 1.29 |
| 1/1 | 5% | BMA-49 | 70 | 125 min | 83% | 23,610 | 29,820 | 1.16 |
| 7/3 | 23% | — | 70 | 19.5 h | 41% | 11,600 | 30,200 | 1.8 |

Surfactant/water ratio (weight)

| Surfactant | wt. ratio | Ref. | Temp. | Time | Conv. | $M_{n,th}$ | $M_{n,sec}$ | $M_w/M_n$ |
|---|---|---|---|---|---|---|---|---|
| Brij ® 98 | 5% | BMA-8 | 90 | 75 min | 89% | 25,200 | 33,950 | 1.29 |
|  | 3% | BMA-11 | 90 | 80 min | 82% | 23,430 | 30,200 | 1.22 |
|  | 2% | BMA-10 | 90 | 75 min | 85% | 24,170 | 32,290 | 1.28 |
|  | 1% | BMA-9 | 90 | 70 min | 81% | 22,890 | 28,170 | 1.26 |
|  | 0.2% | BMA-37 | 70 | 123 min | 85% | 24,170 | 33,860 | 1.30 |

Example 10

Polymerization at Various Temperatures: To a round bottom flask equipped with a magnetic stir bar, surfactant (wt % relative to water), ligand, and transition metal (all with ratio water/monomer/metal/ligand/initiator=1333/200/1/2/1) were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

| Temp. (° C.) | Surfactant | Ref. | Temperature Time | Conv. | $M_{n,th}$ | $M_{n,sec}$ | $M_w/M_n$ |
|---|---|---|---|---|---|---|---|
| 90 | 2% | BMA-10 | 75 min | 85% | 24,170 | 32,290 | 1.28 |
| 70 | 2% | BMA-23 | 105 min | 88% | 25,030 | 33,980 | 1.25 |
| 50 | 2% | BMA-33 | 200 min | 78% | 22,180 | 35,430 | 1.25 |
| 22 | 1% | BMA-18 | 7.2 hr | 95% | 27,100 | 33,710 | 1.18 |

Example 11

Polymerization with Added Deactivator: To a round bottom flask equipped with a magnetic stir bar, surfactant (2 wt % relative to water), ligand, and transition metal (all with ratio water/monomer/metal/ligand/initiator=1333/200/1/2/1) were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to the desired temperature. Samples were taken to monitor conversion (by gas chromatography) and molecular weight (by size exclusion chromatography).

| $CuBr_2$ (% vs. $Cu_{total}$) | Ref. | Temp. | With/without external $CuBr_2$ added Time | Conv. | $M_{n,th}$ | $M_{n,sec}$ | $M_w/M_n$ |
|---|---|---|---|---|---|---|---|
| 0% | BMA-33 | 50 | 200 min | 77% | 22,180 | 35,430 | 1.25 |
| 13% | BMA-34 | 50 | 200 min | 77% | 21,900 | 29,720 | 1.17 |

Example 12

Comparison of Order of Initiator Addition: Surfactant (wt % relative to water), ligand, and transition metal (all with ratio water/monomer/metal/ligand/initiator=1333/200/1/2/1) were all added to a round bottom flask equipped with a magnetic stir bar, and the flask sealed with a rubber septum. The contents of the flask were degassed by applying a vacuum and back-filling with nitrogen (three times). Degassed water and monomer were then added via syringe. The mixture was stirred until all solids were dissolved. Initiator was added either at the same time as the monomer (First) or after the reaction was stirred to give an emulsified mixture (Last). The reaction was heated to 70° C. Samples were taken to monitor conversion (by gas chromatography) and molecular weight (by size exclusion chromatography).

Method of initiator addition (EBiB)

| EBiB | Brij ® 98 | Ref. | Temp. | Time | Conv. | $M_{n,th}$ | $M_{n,sec}$ | $M_w/M_n$ |
|---|---|---|---|---|---|---|---|---|
| First | 2% | BMA-21[1] | 70 | 100 min | 76% | 21,610 | 34,120 | 1.25 |
| Last | 2% | BMA-23[2] | 70 | 105 min | 88% | 25,030 | 33,980 | 1.25 |

[1]a lot of coagulation.
[2]no coagulation, stable emulsion

Example 13

Statistical copolymerization of n-butyl acrylate and methyl methacrylate: A dry Schlenk flask with magnetic stirring bead was charged with CuBr (6.7 mg; 0.047 mmol), 4,4-di(alkyl)-2,2-bipyridine (40 mg; 0.105 mmol), Brij® 98 (0.3 g) and cycled between vacuum and nitrogen three times. Degassed methyl methacrylate (0.63 ml, 5.9 mmol), n-butyl acrylate (0.87 ml, 6.1 mmol), water (10 ml) and hexadecane (0.1 ml) were added to the flask using degassed syringes and stainless steel needles. The flask was placed in an oil bath held by a thermostat at 90° C. and the solution stirred vigorously until an emulsion was formed. Ethyl 2-bromoisobutyrate (6.9 μl, 0.047 mmol) was injected quickly under a nitrogen atmosphere. At various times samples were taken via syringe to monitor conversion (GC) and molecular weight (SEC).

| Time (hr) | MMA Conv. (%) | BA Conv. (%) | $M_n$ (theo.) | $M_n$ (SEC) | $M_w/M_n$ |
|---|---|---|---|---|---|
| 0.5 | 29.4 | 0.5 | 3750 | 9300 | 1.20 |
| 1 | 46.2 | 19.7 | 7010 | 11100 | 1.22 |
| 1.5 | 55.4 | 23.8 | 10870 | 12280 | 1.22 |
| 3 | 64.6 | 24.7 | 12170 | 15340 | 1.21 |
| 5.5 | 77.8 | 38.7 | 16140 | 18290 | 1.20 |
| 10 | 89.6 | 53.7 | 20100 | 21560 | 1.19 |
| 24 | 100 | 66.9 | 23580 | 24130 | 1.21 |
| 48 | 100 | 80.0 | 25750 | 26840 | 1.22 |

Example 13

Statistical copolymerization of n-butyl methacrylate and methyl methacrylate: A dry Schlenk flask with magnetic stirring bead was charged with CuBr (6.8 mg; 0.047 mmol), 4,4-di(alkyl)-2,2-bipyridine (40 mg; 0.105 mmol), Brij® 98(0.3 g) and cycled between vacuum and nitrogen three times. Degassed methyl methacrylate (0.5 ml, 4.7 mmol), n-butyl methacrylate (0.75 ml, 4.7 mmol), water (10 ml) and hexadecane (0.1 ml) were added to the flask using degassed syringes and stainless steel needles. The flask was placed in an oil bath held by a thermostat at 70° C. and the solution stirred vigorously until an emulsion was formed. Ethyl 2-bromoisobutyrate (6.9 μl, 0.047 mmol) was injected quickly under a nitrogen atmosphere. At various times samples were taken via syringe to monitor conversion (GC) and molecular weight (SEC).

| Time (hr) | MMA Conv. (%) | BMA Conv. (%) | $M_n$ (theo.) | $M_n$ (SEC) | $M_w/M_n$ |
|---|---|---|---|---|---|
| 0.5 | 41.1 | 43.4 | 10270 | 17280 | 1.22 |
| 1 | 55.6 | 67.1 | 15090 | 22240 | 1.23 |
| 1.5 | 66.5 | 75.6 | 17390 | 25930 | 1.24 |
| 2.5 | 85.8 | 92.0 | 21640 | 29680 | 1.25 |
| 5 | 93.0 | 100 | 23500 | 33550 | 1.25 |

Example 14

Chain Extension of n-butyl methacrylate: A dry Schlenk flask with magnetic stirring bead was charged with CuCl (4.7 mg; 0.047 mmol), 4,4-di(alkyl)-2,2-bipyridine (40 mg; 0.105 mmol), Brij® 98(0.3 g) and cycled between vacuum and nitrogen three times. Degassed n-butyl methacrylate (1.5 ml, 9.4 mmol), water (10 ml) and hexadecane (0.1 ml) were added to the flask using degassed syringes and stainless steel needles. The flask was placed in an oil bath held by a thermostat at 70° C. and the solution stirred vigorously until an emulsion was formed. Ethyl 2-bromoisobutyrate (6.9 μl, 0.047 mmol) was injected quickly under a nitrogen atmosphere. After 2.5 hours, a second oxygen-free emulsion of n-butyl methacrylate (3.0 ml, 18.8 mmol), water (10 ml) and Brij® 98(0.3 g) was cannulated into the Schlenk flask. At various times samples were taken via syringe to monitor conversion (GC) and molecular weight (SEC).

| Time (hr) | BMA Conversion (%)[a] | $M_n$ (theo.) | $M_n$ (SEC) | $M_w/M_n$ |
|---|---|---|---|---|
| 2.5[b] | 75 | 21440 | 30220 | 1.33 |
| 2.5[c] | 76 | 21580 | 30960 | 1.45 |
| 5.5 | 151 | 64480 | 76910 | 1.48 |
| 19 | 300 | 85200 | 105100 | 1.45 |

[a]Relative to percent conversion of first monomer feed.
[b]Before second monomer addition.
[c]After second monomer addition.

Example 15

Block copolymerization of n-butyl methacrylate and methyl methacrylate by sequential addition: A dry Schlenk flask with magnetic stirring bead was charged with CuBr (6.9 mg; 0.047 mmol), 4,4-di(alkyl)-2,2-bipyridine (40 mg; 0.105 mmol), Brij® 98(0.3 g) and between vacuum and nitrogen three times. Degassed n-butyl methacrylate (1.5 ml, 9.4 mmol), water (10 ml) and hexadecane (0.1 ml) were added to the flask using degassed syringes and stainless steel needles. The flask was placed in an oil bath held by a thermostat at 70° C. and the solution stirred vigorously until an emulsion was formed. Ethyl 2-bromoisobutyrate (6.9 μl, 0.047 mmol) was injected quickly under a nitrogen atmosphere. After 2 hours, a second oxygen-free emulsion of methyl methacrylate (2.0 ml, 18.7 mmol), water (10 ml) and Brij® 98(0.3 g) was cannulated into the Schlenk flask. At various times samples were taken via syringe to monitor conversion (GC) and molecular weight (SEC).

| Time (hr) | BMA Conv. (%) | MMA Conv. (%) | $M_n$ (theo.) | $M_n$ (SEC) | $M_w/M_n$ |
|---|---|---|---|---|---|
| 2[a] | 80 | | 22720 | 30010 | 1.23 |
| 2.1[b] | 77 | 0 | 21870 | 31000 | 1.23 |
| 4 | 90 | 43 | 42760 | 61330 | 1.41 |
| 22 | 94 | 55 | 48700 | 77290 | 1.62 |

[a]Before second monomer addition.
[b]After second monomer addition.

Example 17

Comparison of Various Surfactants: To a round bottom flask equipped with a magnetic stir bar, surfactant, ligand, and transition metal (all with ratio water/monomer/metal/ligand/initiator=1333/200/1/2/1) were all added and the flask sealed with a rubber septum. The contents of the flask were degassed by applying a vacuum and back-filling with nitrogen (three times). Degassed water and monomer were then added via syringe. The mixture was stirred until all solids were dissolved. Initiator was then added and the reaction heated to 70° C. Samples were taken to monitor conversion (by gas chromatography) and molecular weight (by size exclusion chromatography).

| Reference | Surfactant (wt %) | Monomer | Time (h) | Conv. (%) | $M_{n, SEC}$ | $M_w/M_n$ | Latex Stability[a] |
|---|---|---|---|---|---|---|---|
| BMA-2 | PEG 1000 (10) | BMA | 1 | n/a | 24 000 | 1.21 | Unstable |
| BMA-1 | PEG 4600 (10) | BMA | 1 | n/a | 23 000 | 1.20 | Unstable |
| BMA-7 | Brij ® 97 (5) | BMA | 0.67 | 85 | 26 800 | 1.25 | Unstable |
| BMA-9 | Brij ® 98 (1) | BMA | 1.17 | 81 | 28 200 | 1.26 | Stable |
| BA-12 | Brij ® 98 (2) | BA | 20.3 | 94 | 20 400 | 1.14 | Stable |
| Sty-1 | Brij ® 98 (2) | Sty | 20.3 | 90 | 10 600 | 1.07 | Stable |
| MMA-3 | Brij ® 98 (5) | MMA | 1.3 | 69 | 18 600 | 1.15 | Stable |
| BMA-26 | Tween ® 20 (2) | BMA | 2 | 90 | 35 200 | 1.22 | Stable |
| BMA-27 | Tween ® 80 (2) | BMA | 2 | 86 | 34 600 | 1.23 | Stable |
| BA-15 | Tween ® 80 (2) | BA | 20 | 72 | 17 600 | 1.13 | Stable |
| Sty-3 | Tween ® 80 (3) | Sty | 20.5 | 66 | 12 800 | 1.06 | Stable |
| BMA-29 | DTMAB (5) | BMA | 1 | 64 | 21 200 | 1.24 | Stable |

[a]Indicates whether a latex (stable) was obtained at the end of the polymerization or if coagulation/flocculation was observed (unstable).

Example 16

Block copolymerization of methyl methacrylate and methyl acrylate using pre-made macroinitiator: A dry Schlenk flask with magnetic stirring bead was charged with CuBr (3.6 mg; 0.025 mmol), 4,4-di(alkyl)-2,2-bipyridine (20 mg; 0.05 mmol), Brij® 98(0.3 g) and cycled between vacuum and nitrogen three times. Degassed methyl acrylate (0.22 ml, 2.4 mmol), water (5 ml) and hexadecane (0.1 ml) were added to the flask using degassed syringes and stainless steel needles. The flask was placed in an oil bath held by a thermostat at 70° C. and the solution stirred vigorously until an emulsion was formed. A round bottom flask containing a magnetic stirring bead was charged with poly(methyl methacrylate) which was terminated with a Cl atom (0.3 g; 0.025 mmol; $M_n$=12000; PD=1.13), Brij® 98(0.3 g) and cycled between vacuum and nitrogen three times. Degassed methyl acrylate (0.6 ml, 6.7 mmol) was added to the round bottom flask and the poly(methyl methacrylate) allowed to dissolve, then degassed water (5 ml) and toluene (0.5 ml) were also added to the round bottom flask using degassed syringes and stainless steel needles. The contents of the round bottom flask were stirred vigorously until an emulsion formed, and then the emulsion was cannulated into the Schlenk flask, which was placed in an oil bath held by a thermostat at 90° C. At various times samples were taken via syringe to monitor conversion (GC) and molecular weight (SEC). After 16 hours, monomer conversion was 67%, $M_n$=21,700 and PD=1.27 (SEC).

Example 18

Use of a non-conjugated ligand for emulsion: To a 25 ml Schlenk flask charged with 7.5 mg (0.052 mmol) of CuBr, 16.3 mg (0.052 mmol) of BPMOA (bis(2-pyridylmethyl) octylamine) and 0.2 g of Brij 98 under a $N_2$ atmosphere, 1.5 ml of degassed BA (10.5 mmol) and 10 ml of degassed deionized water were added. The mixture was stirred to form an emulsified mixture. The flask was placed in an oil bath at 70 C, and 7.7 ul of EBiB was added via syringe. The magnetic stirring rate was 1100 rpm. After 8.25 h, 81% conv., $M_n$=31,850 (1.64), $M_{n,th}$=20,740,

Example 19

Use of potassium persulfate in a Reverse ATRP emulsion polymerization: 7.8 mg (0.035 mmol) of $CuBr_2$, 27.6 mg (0.072 mmol) of dAbipy and 0.2 g of Brij 98 were added to a round bottom flask with a stir bar. After degassed under vacuum/$N_2$ cycle for 3 times, the flask was charged of 1.5 ml (9.4 mmol) of degassed BMA. The mixture was stirred well until a homogeneous solution was obtained. 6.7 mg (0.025 mmol) of potassium persulfate ($DP_n$=200) in 10 ml of buffer solution (Fisher, $KH_2PO_4$/NaOH, pH=7) was dissolved and added to the flask with the monomer solution which was then placed in an oil bath at 70 C. The magnetic stirring rate was 1100 rpm. 5 h, 72% conv., $M_n$=53,100 (1.36), $M_{n,th}$=20,480, Initiator efficiency=0.39. In a similar procedure, a $DP_n$=100 experiment was done. After 4 h, conv.=44%, $M_n$=20,700 (1.10), $M_{n,th}$=6,260. Initiator efficiency=0.30.

Example 20

Chain Extension of n-butyl acrylate: A dry Schlenk flask with magnetic stirring bead was charged with CuBr (7.6 mg;

0.053 mmol), 4,4-di(alkyl)-2,2-bipyridine (40 mg; 0.105 mmol), Brij98 (0.2 g) and cycled between vacuum and nitrogen three times. Degassed n-butyl acrylate (1.5 ml, 10.5 mmol), water (10 ml) and hexadecane (0.1 ml) were added to the flask using degassed syringes and stainless steel needles. The flask was placed in an oil bath held by a thermostat at 90° C. and the solution stirred vigorously until an emulsion was formed. Ethyl 2-bromoisobutyrate (7.7 μl, 0.052 mmol) was injected quickly under a nitrogen atmosphere. After 29 hours, a second oxygen-free emulsion of n-butyl acrylate (3.0 ml, 21.0 mmol), water (10 ml) and Brij98 (0.4 g) was cannulated into the Schlenk flask. At various times samples were taken via syringe to monitor conversion (GC) and molecular weight (SEC).

| Time (hr) | Conv. (%)[m] | $M_n$ (theo.) | $M_n$ (SEC) | $M_w/M_n$ |
|---|---|---|---|---|
| 0 | 0 | 0 | | |
| 1 | 29 | 7480 | 9140 | 1.30 |
| 2 | 36 | 9270 | 10410 | 1.27 |
| 4 | 46 | 11830 | 13200 | 1.20 |
| 9 | 58 | 14820 | 16450 | 1.15 |
| 18 | 69 | 17640 | 19460 | 1.13 |
| 29[b] | 78 | 19970 | 21250 | 1.14 |
| 29[c] | 79 | 19970 | 22210 | 1.11 |
| 45 | 136 | 34750 | 34680 | 1.22 |
| 53 | 140 | 35660 | 38310 | 1.25 |
| 66 | 165 | 42250 | 44750 | 1.27 |

[a]Relative to percent conversion of first monomer feed.
[b]Before second monomer addition,
[c]After second monomer addition.

Example 21

Water-borne ATRP of n-BMA using Cu(I)Br/dAbipy, 2-hydroxyethyl-2-bromoisobutyrate. To a 25 ml round bottle flask with a magnetic stir bar was charged Brij 98 surfactant (0.2 g), 4,4-dialkyl byridine (0.035 g, 0.094 mmol), copper(I) bromide (0.0068 g, 0.047 mmol), and hexadecane (internal standard, 0.2 ml). The reaction flask was fitted with a rubber septa, evacuated and back-filled with argon (3×). Degassed n-butyl methacrylate (1.5 ml, 9.4 mmol) and De-ionized water (10 ml) were then added. Agitation of the flask was conducted until all of the surfactant was dissolved, and a red-brown emulsion was obtained. The initiator, 2-hydroxyethyl-2-bromoisobutyrate (5.5 μL, 0.047 mmol) was then injected into the flask. The reaction flask was then placed in an oil bath at 70° C. for 1.75 hrs. Conv.=57% (from GC) $M_n$=33,750; $M_w/M_n$=1.30 (from GPC against PS).

Example 22

Water-borne Reverse ATRP using Cu(II)Br$_2$/dAbipy, 2,2-azobis(2-amidopropane)dihydrogen chloride. To a 500 ml three-neck flask was charged Brij 98 surfactant (2.0 g), dAbipy (0.258 g, 0.68 mmol), copper(II) bromide (0.08 g, 0.34 mmol), and hexadecane (internal standard, 0.2 ml). The reaction flask was then evacuated and back-filled with argon (3×). Degassed n-butyl methacrylate (1.5 ml, 0.094 mol) and allowed to stir till all of the Cu(II)Br$_2$ was in solution. De-ionized water (100 ml) was then also added. Agitation of the flask was conducted using a mechanical stirrer until all of the surfactant was dissolved, and a light-green emulsion was obtained. The initiator, 2,2-azobis(2-amidopropane) dihydrogen chloride (AMPA) (0.064 g, 0.23 mmol), dissolved in 5 ml of degassed water was then injected into the reaction flask and the temperature was set at 90° C. Conversion was monitored by GC (p=99%) and the final polymer was analyzed by GPC, $M_n$=24,780; $M_w/M_n$=1.36

Example 23

Water-borne ATRP of n-BMA using Cu(II)Br$_2$/dAbipy, Cu(0) turnings. To a 25 ml round bottle flask with a magnetic stir bar was charged Brij 98 surfactant (0.2 g), 4,4-dialkyl byridine (0.035 g, 0.094 mmol), copper(II) bromide (0.010 g, 0.047 mmol), copper(0) powder (0.0029 g, 0.047 mmol) and hexadecane (internal standard, 0.2 Ml). The reaction flask was fitted with a rubber septa and then evacuated and back-filled with argon (3×). Degassed n-butyl methacrylate (1.5 ml, 9.4 mmol) and the reaction solution was allowed to stir for several hours, resulting in a deep red solution. The red solution was then transferred to a degassed 25 ml Schlenk flask which contained Brij 98 (0.20 g) and hexadecane (0.40 ml). De-ionized water (10 ml) was then added to the Schlenk flask. Agitation of the flask was conducted until all of the surfactant was dissolved, and a red-brown emulsion was obtained. Ethyl 2-bromoisobutyrate (6.9 μL, 0.047 mmol) was then injected into the flask. The reaction flask was then placed in an oil bath at 70° C. for 18 hrs. Conversion was monitored by GC (p=0.89) and the final polymer analyzed by GPC ($M_n$=14,070; $M_w/M_n$=1.14)

Example 24

Water-borne ATRP of n-BMA using Cu(II(CF$_3$SO$_3$) dAbipy, Cu(0) powder. To a 25 ml round bottle flask with a magnetic stir bar was charged Brij 99 surfactant (0.2 g), 4,4-dialkyl byridine (0.035 g, 0.094 mmol), Cu(II)(CF$_3$SO$_3$)$_2$/(0.0169 g, 0.047 mmol), copper(0) powder (0.0029 g, 0.047 mmol) and hexadecane (internal standard, 0.2 Ml). The reaction flask was fitted with a rubber septa and then evacuated and back-filled with argon (3×). Degassed n-butyl methacrylate (1.5 Ml, 9.4 mmol) and the reaction solution was allowed to stir for several hours, resulting in a deep red solution. De-ionized water (10 ml) was then added. Agitation of the flask was conducted until all of the surfactant was dissolved, and a red-brown emulsion was obtained. Ethyl 2-bromoisobutyrate (6.9 μL, 0.047 mmol) was then injected into the flask. The reaction flask was then placed in an oil bath at 70° C. for 18 hrs. $M_n$=29,300 $M_w/M_n$=1.15

This application is based on U.S. Provisional application 60/079,805, filed Mar. 30, 1998 in the U.S. Patent Office, the entire contents of which are hereby incorporated by reference.

What is claimed is:

1. A process for the preparation of a (co)polymer emulsion or suspension comprising:
  polymerizing one or more radically (co)polymerizable monomers in the presence of a system initially comprising:
    (a) a suspending medium,
    (b) a monomer phase suspended in said suspending medium, comprising said monomers,
    (c) a surfactant,
    (d) an initiator having one or more radically transferable atoms or groups,
    (e) a catalyst system comprising:
      (i) a transition metal compound capable of participating in a redox cycle with the initiator and,
      (ii) one or more N—, O—, P—, or S— containing ligands which coordinate in a σ-bond or in a π-bond to the transition metal, any C containing compound which can coordinate in a π-bond to the transition metal, or any carbon containing ligand which coordinates in a carbon-transition metal σ-bond but which does not form a carbon-carbon bond with said monomer under the polymerization conditions, wherein said catalyst system is at least partially soluble in both said monomer phase and in a polymer phase generated during said polymerizing, to form a (co)polymer emulsion or suspension.

2. The process of claim 1, further comprising isolating said (co)polymer.

3. The process of claim 1, wherein the suspending medium is an inorganic liquid.

4. The process of claim 3, wherein the suspending medium is water.

5. The process of claim 4, wherein the ratio of organic phase to water is between 1:100 and 100:1.

6. The process of claim 4, wherein the ratio of organic phase to water is between 1:10 and 10:1.

7. The process of claim 1, wherein the suspending medium is buffered.

8. The process of claim 1, wherein the ligands of component (e) are chosen to render both oxidation states of the transition metal at least partially soluble in the polymerization phase.

9. The process of claim 1, wherein the surfactant is a non-ionic surfactant.

10. The process of claim 1, wherein the surfactant is an ionic surfactant.

11. The process of claim 10, wherein the surfactant is a cationic surfactant.

12. The process of claim 1, wherein the surfactant is present in a concentration of 0.01% to 50% by weight, based on the weight of said system.

13. The process of claim 1, wherein the surfactant controls the stability of the emulsion.

14. The process of claim 13, wherein the surfactant forms a stable emulsion.

15. The process of claim 2, wherein the surfactant allows coagulation of the (co)polymer after polymerization of the (co)monomers to allow isolation of the (co)polymer.

16. The process of claim 1, wherein the role of surfactant and initiator is combined in a single surfactant/initiator molecule.

17. The process of claim 16, wherein the surfactant/initiator is a macromolecule.

18. The process of claim 17, wherein the macromolecule is prepared in situ.

19. The process of claim 17, wherein the macromolecule is at least partially soluble in one or more phases of the emulsion.

20. The process of claim 19, wherein the macromolecule is at least partially soluble in all phases of the emulsion.

21. The process of claim 1, wherein the initiator is prepared in situ.

22. The process of claim 21, wherein one of the precursors of the initiator is a molecule that can form a free radical under application of external stimuli.

23. The process of claim 1, wherein the initiator is soluble in the organic phase.

24. The process of claim 1, wherein the initiator is soluble in the suspending medium.

25. The process of claim 1, wherein the initiator is a macroinitiatior.

26. The process of claim 25, wherein the macroinitiator is prepared in situ.

27. The process of claim 25, wherein the macroinitiator is at least partially soluble in one or more phases of the emulsion.

28. The process of claim 27, wherein the macroinitiator is at least partially soluble in all phases of the emulsion.

29. The process of claim 1, wherein the initiator is the last component added to the initial reaction medium.

30. The process of claim 1, wherein the catalyst is formed in situ by reduction of a higher oxidation state metal.

31. The process of claim 1, wherein one or more monomers may be added continuously, periodically or sequentially to the polymerization to prepare emulsions or suspensions of statistical, gradient or block copolymers.

32. The process of claim 31, wherein the one or more monomers are added in bulk or as a second emulsion.

33. The process of claim 1, further comprising contacting the emulsion with a material that selectively absorbs the transition metal catalyst.

34. The process of claim 33, wherein said material that selectively absorbs the transition metal catalyst is an ion exchange resin.

35. The process of claim 33, further comprising isolating the (co)polymer to provide a catalyst free (co)polymer.

36. The process of claim 1, wherein the suspending medium is an organic medium and the one or more radically (co)polymerizable monomers are dissolved in an inorganic solvent.

37. A (co)polymer emulsion or suspension prepared by the process of claim 1, wherein the (co)polymer contained therein exhibits one or more characteristics selected from the group consisting of predefined molecular weight, narrow molecular weight distribution, well-defined end groups, controlled composition, and controlled architecture.

38. The (co)polymer emulsion or suspension as claimed in claim 37, wherein the (co)polymer contained therein is sufficiently stable to not significantly change its properties after being held at 150° C. for several hours.

39. The (co)polymer emulsion or suspension as claimed in claim 37, wherein the (co)polymer has a molecular weight distribution (Mw/Mn) of <1.5 and known end groups.

40. A (co)polymer emulsion or suspension, wherein the (co)polymer contained therein exhibits two or more characteristics selected from the group consisting of predefined molecular weight, narrow molecular weight distribution, well-defined end groups, controlled composition, and controlled architecture.

* * * * *